J. GRUNDY.
Glass Pitcher.
No. 227,426.  Patented May 11, 1880.
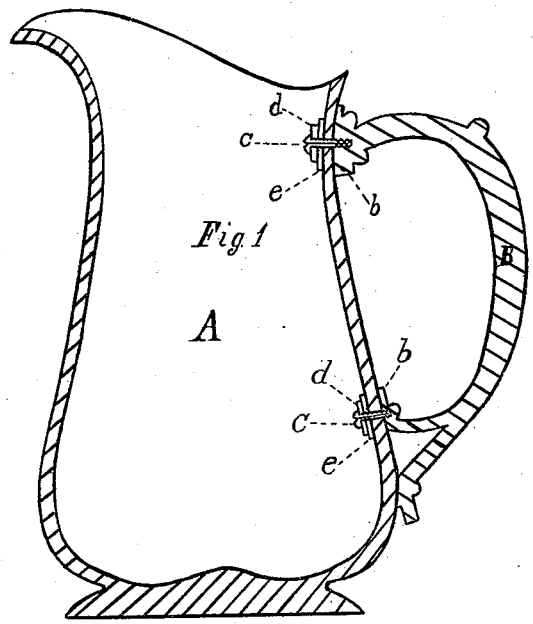
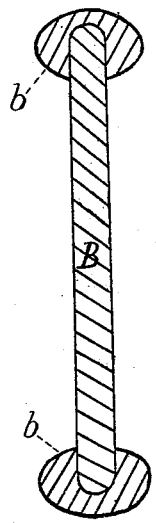
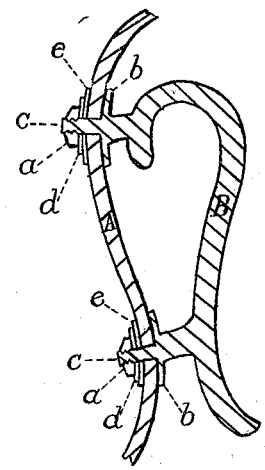
Witnesses
Thomas A. Tipp.
Chas. F. Swift
Inventor
James Grundy
per J. A. Howard Atty

UNITED STATES PATENT OFFICE.

JAMES GRUNDY, OF NEW BEDFORD, MASSACHUSETTS.

GLASS PITCHER.

SPECIFICATION forming part of Letters Patent No. 227,426, dated May 11, 1880.

Application filed January 29, 1880.

*To all whom it may concern:*

Be it known that I, JAMES GRUNDY, of New Bedford, in the county of Bristol and State of Massachusetts, have invented certain new and useful Improvements in Glass Pitchers and like articles; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

My invention consists in a new method of making the articles by forming the body parts without handles and attaching the handles thereto afterward, the handle or attachment being constructed of metal and arranged with suitable means of connection, so as to be detachable, yet readily applied to form a firm and secure holder, as will be more fully described hereinafter.

Figure 1 shows a sectional view of a pitcher and the metal handle as attached to same. A is the glass pitcher. B is the handle, terminating in two plates or bosses, *b b*, having suitably-curved faces to fit and conform to the shape of pitcher. These plates or bosses *b b* have a threaded hole fitted with screws *c c*. The body part of the pitcher A is provided with apertures to receive the screws. *d d* are supporting plates or washers. *e e* are gaskets of rubber or other suitable elastic material.

Fig. 2 shows a front view of handle.

Fig. 3 shows a modification of handle and attaching-screws. These screws form part of handle, the tightening-nuts forming the heads, as in ordinary screw-bolts.

In pitchers or glass vessels as usually made, after the body part is formed the workman proceeds to attach a handle of like material by gathering a suitable piece of glass and sticking a portion to the side, at the same time drawing it out and cutting it from the gathering-iron. To insure a firm hold it is important that the vessel should be of a proper heat, and as the operation has to be governed by the eye of the workman, it requires considerable care on his part to insure its being fixed true with the body of the article, which meanwhile is cooling before the second joining of the handle to the lower portion of the pitcher can be made. If the heat of each portion is not uniform, an imperfect joint is the result. Considerable breakage results from this cause, as neither the body of the article nor handle is of use when separate, though each is otherwise intact. Fixing the handle causes such delay that the article often cracks apart before reaching the leer or annealing-oven.

In practicing my invention I proceed to form and complete the body of the pitcher or vessel in the usual way known to the art, and when formed it is immediately transferred to the leer or annealing-oven, and as no handles have to be formed, less skilled labor is needed and a much larger quantity is produced, thus cheapening the production.

When annealing is completed, as the article is cold, it can be readily handled, and by proper marking-tools great accuracy can be insured in placing the handle, which cannot be the case when glass handles are attached while in course of making.

After the body parts are marked I take a suitable drill and cut the needed holes through the sides of the articles, or when the articles are formed by pressing these attaching-holes can be formed while in the mold, so that the article is ready for the handle as soon as sufficiently annealed, without any further preparation.

The handles are formed of brass or any suitable metal, and are provided with a plate or flange to fit the outer surface of pitcher. I prefer to have this flange-plate of soft or pliable metal, so that in event of glass not being uniform the plate can be readily adjusted thereto and insure a firm hold. These handles can be finished either by silver or nickel plating, or can be cased with japan, or in any other desired manner.

When the pitcher and handle are ready the workman fits the screws, placing a rubber or elastic gasket against the inner side of glass; or, if desired, a like gasket can be placed between outer side and flange on handle. The inner gasket prevents leakage and too great a pressure on the glass. The supporting-plate is then placed and the screw is tightened up, and the article completed for the market.

My handles could be readily applied to articles that had had the handles broken, thus rendering them useful.

I am aware as to the state of the art that glass pitchers with metallic handles are not new; but the object of my invention is to provide against the destruction of such pitchers from breakage, it having been found in practice that pitchers with metallic handles are very liable to crack when any heated fluid or other body is being conveyed therein, and that frosty weather also renders them unreliable unless constructed with gaskets as a means of distributing the pressure over a large surface and allowing for contraction and expansion of the glass transversely. In no other way can this object be effected than by the means and construction shown.

What I claim is—

The combination of the handle B, plate or bosses $b\ b$, supporting plates or washers $d\ d$, and gaskets $e\ e$, the parts being secured by screws $c\ c$ to pitcher A, substantially as shown and described.

In testimony that I claim the foregoing as my own invention I affix my signature in presence of two witnesses.

JAMES GRUNDY.

Witnesses:
R. G. TOBEY,
GEORGE E. WHITE.